United States Patent [19]
Kistner

[11] 3,788,307
[45] Jan. 29, 1974

[54] ORTHOPEDIC SPLINT

[76] Inventor: Howard M. Kistner, 233 Adams Ave., Dickenson, N. Dak. 58601

[22] Filed: May 1, 1972

[21] Appl. No.: 248,978

[52] U.S. Cl. ............................... 128/77, 128/87 R
[51] Int. Cl. ............................................. A61f 5/10
[58] Field of Search 128/77, 89, 90, DIG. 6, DIG. 15, 128/133, 87, 83

[56] References Cited
UNITED STATES PATENTS

| | | | |
|---|---|---|---|
| 3,232,289 | 2/1966 | Zimmerman | 128/87 |
| 2,697,436 | 12/1954 | Coston | 128/DIG. 6 |
| 3,640,273 | 2/1972 | Ray | 128/DIG. 15 |
| 2,958,325 | 11/1960 | Claydon et al. | 128/90 |
| 3,059,636 | 10/1962 | Schwartz | 128/DIG. 6 |
| 3,439,673 | 4/1969 | Sprecher | 128/133 |
| 2,357,323 | 9/1944 | Goldberg | 128/77 |

OTHER PUBLICATIONS

Orthopaedic Appliances Atlas, Vol. I, page 313, FIG. 445 C, copyright 1952.

*Primary Examiner*—Richard A. Gaudet
*Assistant Examiner*—J. Yasko

[57] ABSTRACT

A dorsal or anterior splint for supporting the wrist and hand joints and substantially limiting the movement thereof while permitting some effective functioning of the limb extremity. A spine-like rigid plate laminate of aluminum is surrounded by and covered on its front surface by a cushioning pad laminate of neoprene foam. A leather-like flexible skin laminate covers the back of the plate and the pad. All three of the laminae are adhesively bonded to each other. A continuous elastic loop bonded between the plate and the skin at the distal end of the splint is for holding the middle two fingers snugly against the pad. Three straps extend transversely outwardly from the skin laminate to pass around the arm, wrist and hand, respectively, and to releasably fasten back on the skin laminate to hold those body parts snugly against the pad. The spine-like plate can be deformed before applying it to the limb extremity, so that when it is so applied, it will support the arm, wrist and hand in other than mutually aligned relation where that is desirable. To apply localized but evenly distributed pressure on the limb between it and the spine-like plate, a stiff, flexible, resilient slab is adhesively bonded to the pad between it and the plate. Thumb screws are threadably mounted in the plate to bear on the slab to deform it to put localized pressure on the limb.

2 Claims, 5 Drawing Figures

PATENTED JAN 29 1974 3,788,307

ORTHOPEDIC SPLINT

BACKGROUND OF THE INVENTION:

This invention has relation to one form of orthopedic splint useful for dorsal or anterior application on the wrist and hand limb extremity, either left or right.

For many years an accepted procedure for immobilizing the lower arm, wrist and hand to permit healing of broken bones, such as the metacarpus for example, was to encase the entire limb extremity in a plaster of Paris cast. This necessarily almost completely immobilized the affected parts, which promoted the necessary reknitting of the bone, but had deleterious side effects such as the tendency of the muscle and other tissue to atrophy because of disuse.

As an alternative to a permanent plaster of Paris cast, Thomas-like splints were employed in some instances, to put tension on the affected parts. These splints must bear against some part of the body, such as the shoulder, extend outwardly of the hand, and are extremely bulky and practically impossible to transport in anything like a normal manner. This limited the patient's ability to get around and to function normally.

Boards have been utilized extending from the elbow, for example, up to and including the fingers, and, with the proper and necessary padding between the board and the arm, adhesive tape and/or straps were utilized to attempt to position the lower extremity of the limb to provide for immobilization of the joints so that healing of the broken bones can take place. This structure was also exceedingly cumbersome and required, in most instances, at least a sling around the neck to support the immobilized forearm, wrist and hand. Furthermore, it was necessarily taken off and put on by a person with extensive training and experience or practice, and could not be taken off for put on by the patient himself.

Temporary splints have been used by first-aiders in emergencies and have consisted of boards, newspapers, rolledup magazines, and the like. These have been taped or roped or otherwise fastened into place, sometimes with appropriate padding and sometimes not, but not for the purpose of promoting the healing process. The purpose of emergency splints used by a first-aider is to attempt to prevent further damage until proper splinting can be devised, prescribed and applied by a physician.

Temporary splints useful in emergency situations and con-sisting of flat adjustable slotted plates are known. See the patent to Parcher, U.S. Pat. No. 2,339,515. Such splints are, however, no more than an attempt to anticipate emergency splinting needs and to form a more readily available and desirable emergency splint than can sometimes be formed using boards, rods, or other materials at hand.

Mechanical adjustable splints have been devised to hold the arm, wrist and hand in predetermined desirable positions, but they have amounted to no more than a metal skeleton framework with adjustable pads which must be forced in their various directions to achieve the result desired by the prescribing physician, and as such, do not lend themselves to use by the patient without skilled professional help. See the two patents to Goldberg, U.S. Pat. No. 2,357,323 and U.S. Pat. No. 2,520,035.

Attempts to place localized pressure on portions of the splinted limb to achieve straightening and supporting effects have been limited to the anchoring of pad support brackets in permanent plaster casts, and using these brackets to force rigid pads directly against the injured member, thus forming, in very short periods of time, extremely sensitive and irritated pad boundary portions of body tissue. When the pain from these pads becomes too intense, the pressure on the pad must be released, thus permitting possible movement between the fractured bone ends which are to be repaired, for example. The realignment of these pressure pads in order to achieve the proper effects on the injured limb inside of the plaster cast can only be observed through the instrumentality of X-rays, or the like. Certainly the patient himself would not be aware of the precise pressures to apply to achieve the alignment desired, or even the alignment originally achieved by the physician installing the cast. See the patent to Bloomberg, U.S. Pat. No. 2,295,253.

BRIEF SUMMARY OF THE INVENTION:

A preformed orthopedic splint includes a spine-like plate laminate of rigid material. In one form of the invention, this material is deformable to semi-permanently change the shape of the entire splint. A flat pad laminate of foam-like cushion material covers and extends peripherally outward of a front surface of the spine-like plate. A leather-like flexible skin laminate covers the back of the plate and the outwardly extending edges of the pad. All three laminae are adhesively bonded to each other. The plate is normally planar in form, but can have an indentation near the distal end thereof to assist the pad in accommodating the shape of the first knuckle joints whether the splint is applied in a dorsal or anterior position.

A continuous elastic loop is attached to the splint near the distal end thereof and is for holding one or more of the fingers snugly against the pad. A plurality of straps extend transversely outwardly from the skin laminate and are of length to pass around aligned portions of the arm, wrist and hand, and to releasably fasten back at the skin laminate, to hold these portions of the limb extremity snugly against the pad.

Where it is desired that the arm, wrist and hand be splinted in position other than in normal alignment with each other, the spine-like plate of certain forms of the invention is of a character to be semi-permanently deformable to shape the entire splint so that the limb extremities, when fastened in snug relationship to the splint pad as explained above, will take on the desired shape.

Where it is desired that localized pressure be applied on portions of the limb extremity in alignment with certain portions of the spine-like plate, a stiff but flexible flat slab is positioned between the plate and the pad, and is secured in such a fashion that it will not have transverse or longitudinal movement with respect to the pad. At least one set screw or thumb screw, and in the usual case a plurality of such screws, is threadably mounted through the flexible skin laminate and in the spine-like plate to extend therethrough. When the limb extremity is properly splinted, at least one of these set screws, in approximate alignment with the place where pressure on the limb extremity is desired, is turned down to cause the stiff, flexible pad to be forced away from the plate, to exert the desired localized pressure on the desired portion of the limb extremity.

Once the thumb screw adjustment has been made, the splint can be removed by unfastening the straps; but the proper pressure on the proper portion of the limb extremity can be reachieved whenever the splint is put back into place by refastening the straps.

Figure 1:
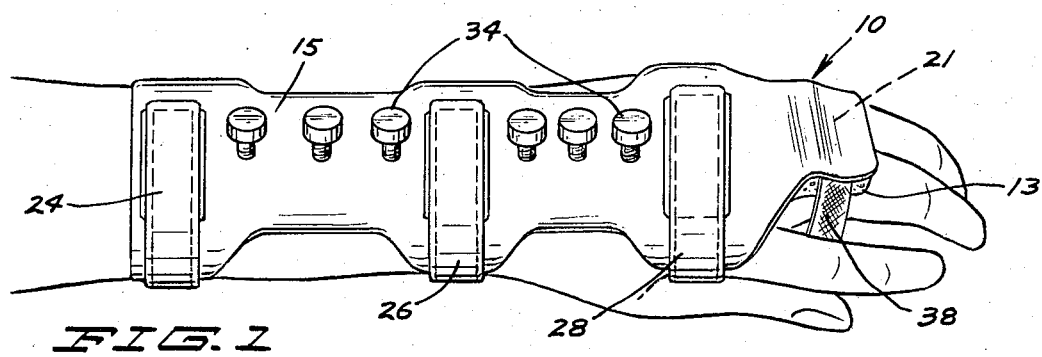
FIG. 1 is a perspective view showing the splint of the invention installed for dorsal use on the forearm, wrist and hand.

DESCRIPTION OF PREFERRED EMBODIMENT:

An orthopedic splint 10 includes a spine-like rigid plate laminate 11. In some forms of the invention, this plate can be constituted as a non-deformable metal or plastic, but in many forms of the invention, it will be constituted of material which can be deformed to semi-permanently change the shape of the entire splint in a manner to be described later. Aluminum has been found to be an excellent material for this purpose.

A second laminate of the splint is a cushioning pad laminate 13 of foam or other resilient material. Neoprene foam has been found to be excellent for the purpose. The third laminate of the splint 10 is a leather-like flexible skin laminate 15 which completely covers the back surface of the plate 11, and the outwardly extending edges of the pad 13. As shown, all three of the laminae are adhesively bonded together with a suitable bonding agent or glue on boundary layers 17 and 19.

In some forms of the invention, the spine-like rigid plate laminate 11 could be made entirely flat, but it has been found helpful to provide a depression 21 in this plate near the distal end of the splint to accommodate the first knuckle joints when the splint is applied in a dorsal position and to accommodate the palm in alignment with these joints when the splint is applied in the interior position.

A stiff, flexible, resilient slab 22, in the form of the invention as shown, is adhesively bonded to the pad 13 between it and the spine-like plate 11. A sheet of plastic or metal having the rigidity and bending and resilient properties of stainless steel or spring steel will be excellent for this purpose; but it is to be understood that in some forms of the invention, the property of resilience could be omitted, to the end that the slab would tend to remain in the deformed position once it had been shaped in the manner described below.

An arm strap 24, a wrist strap 26, and a hand strap 28 are shown to be integral with and to extend outwardly from the skin laminate 15. The back portion of this skin laminate is provided with one-half of the bonding material suitable for the releasable fastening complementary bonding material on the end of the strap back on top of the flexible skin laminate in alignment with the spine-like plate laminate and in alignment with each of the straps. Such fastening materials can be of the type sold under the trademark VELCRO, and a plurality of fastening pads 30 are permanently affixed on the back of skin laminate 15 for receiving and removably retaining complementary fastening pads 32 which are permanently affixed on the outer ends of the straps.

In the form of the invention as shown, hand screws 34 extend through the flexible skin laminate 15 and fit through tapped holes 36 in the plate laminate 11.

A continuous elastic loop 38 is bonded between the plate 11 and the skin 15 at the distal end of the splint in position to hold the two middle fingers snugly against the pad 13 when the splint is applied.

OPERATION:

When it is desired to use the orthopedic splint of the invention to limit the movement of the wrist and hand joints by support from the back or distal side of the hand and arm, the continuous elastic loop 38 is slid over the two middle fingers and the splint positioned so that the depression 21 in plate 11 is in alignment with the first set of knuckles on the back of the hand. The hand, wrist and forearm are brought into the desired position, and the arm strap 24 is extended around the forearm, and pushed into place, mating fastening pads 30 and 32, to releasably fasten the strap to the skin laminate 15. Wrist strap 26 and hand strap 28 are similarly positioned. it is to be expected that this initial alignment and installation of the splint will often be done by a professionally qualified person such as a physician or surgeon, a physical therapist, etc. Once the patient himself becomes familiarized with the procedure, it is to be understood that he can, operating only with his other hand and arm remove and reinstall the splint of the invention.

In the event that the positioning of the hand, wrist and forearm in alignment with the splint, as seen in FIG. 1, is satisfactory, then no use will be made of the hand screws 34 or the slab 22. In fact, where such normal support use only is envisioned, these features can be left off of the splint entirely.

When support of the forearm, wrist and hand from the anterior side of the outer end of the arm is desired, the elastic loop 38 will be slid over the middle fingers with the distal end of the splint pad 13 in contact with the palm of the hand. The arm strap 24, wrist strap 26, and hand strap 28 will be fastened in the same manner as set out in connection with the distal installation of the splint, initially often by a professionally qualified person, and then, many times, by the patient himself or by those normally available to the patient for help, but without any particular professional qualifications relative to the installation of splints.

Figure 2:
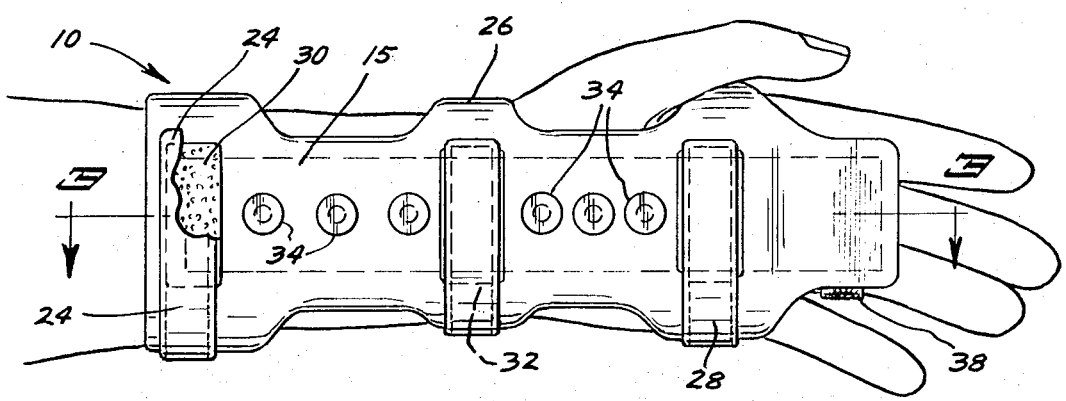
FIG. 2 is a perspective view of the splint of FIG. 1 but showing an anterior installation on the forearm, wrist and hand of the user.

Here again, if the alignment of the parts is satisfactory as seen in FIG. 2, for example, no use will be made of the hand screws 34 and of the slab 22, and these items can be omitted from a splint of the invention.

Figure 3:
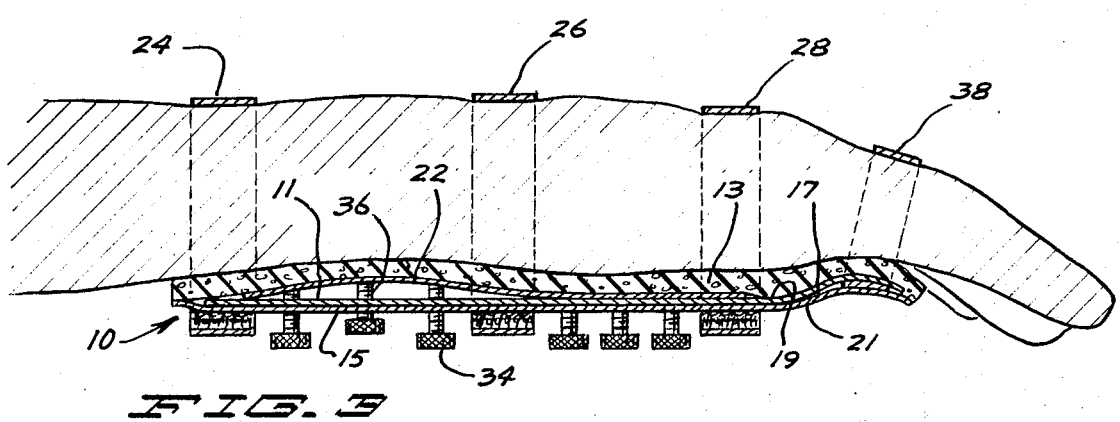
FIG. 3 is a longitudinal sectional view taken on the line 3—3 in FIG. 2.
Figure 4:
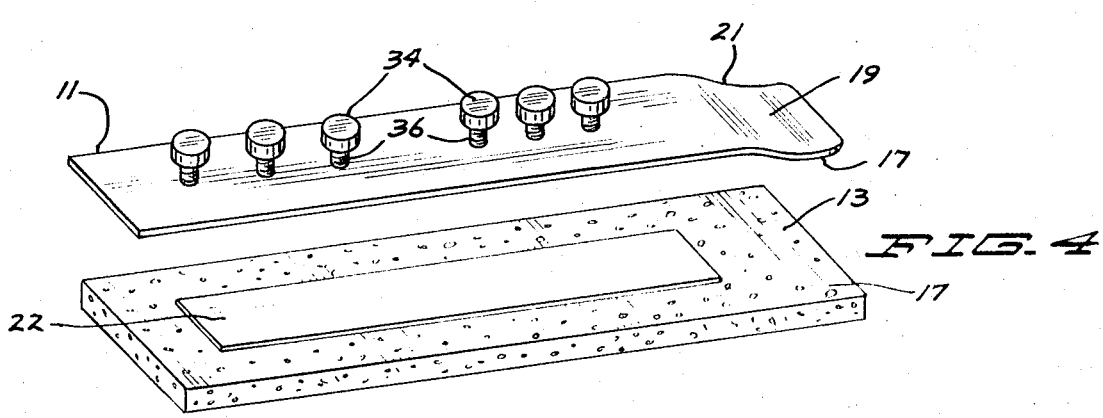
FIG. 4 is an exploded view of the spine-like laminate, the cushioning pad laminate, the flexible slab and the thumb screws of the splint of FIGS. 1, 2 and 3.

However, when it is desired to place additional pressure at localized points, for example, when it is desired to put pressure on the wrist for the purpose of maintaining or gradually achieving alignment of fractured parts, the hand screws, or some of them will be turned down to force the stiff, flexible, resilient slab 22 away from the spine-like rigid plate laminate 11. This is shown in FIG. 3, where several hand screws 34 are turned down to provide evenly distributed pressure at the wrist portion, thus overcoming some tendency for the fractured bones to move out of proper alignment, for example.

It is to be understood, that were the splint of the invention to be temporarily removed for any reason, the same pressure can be reachieved, by repositioning the splint in precisely the same location on the arm, and then fastening the straps in the same position on the skin laminate, just so long as the hand screws 34 are not turned in the plate 11.

In actual practice, several sizes of the splints will be provided to accommodate patients of different size; but it is to be understood that the shape of the splint is such that special splints are not needed for left and right hand use. Any one of the splints illustrated herein can be used on either the right or the left outer arm extremity; but this does not preclude the manufacture of specialized splints which are adapted primarily for either use on the right hand only or on the left hand only, within the spirit of the invention and the scope of the claims which follow. Such splints can be kept available in models with and without slabs 22 and hand screws 34 provided.

Figure 5:
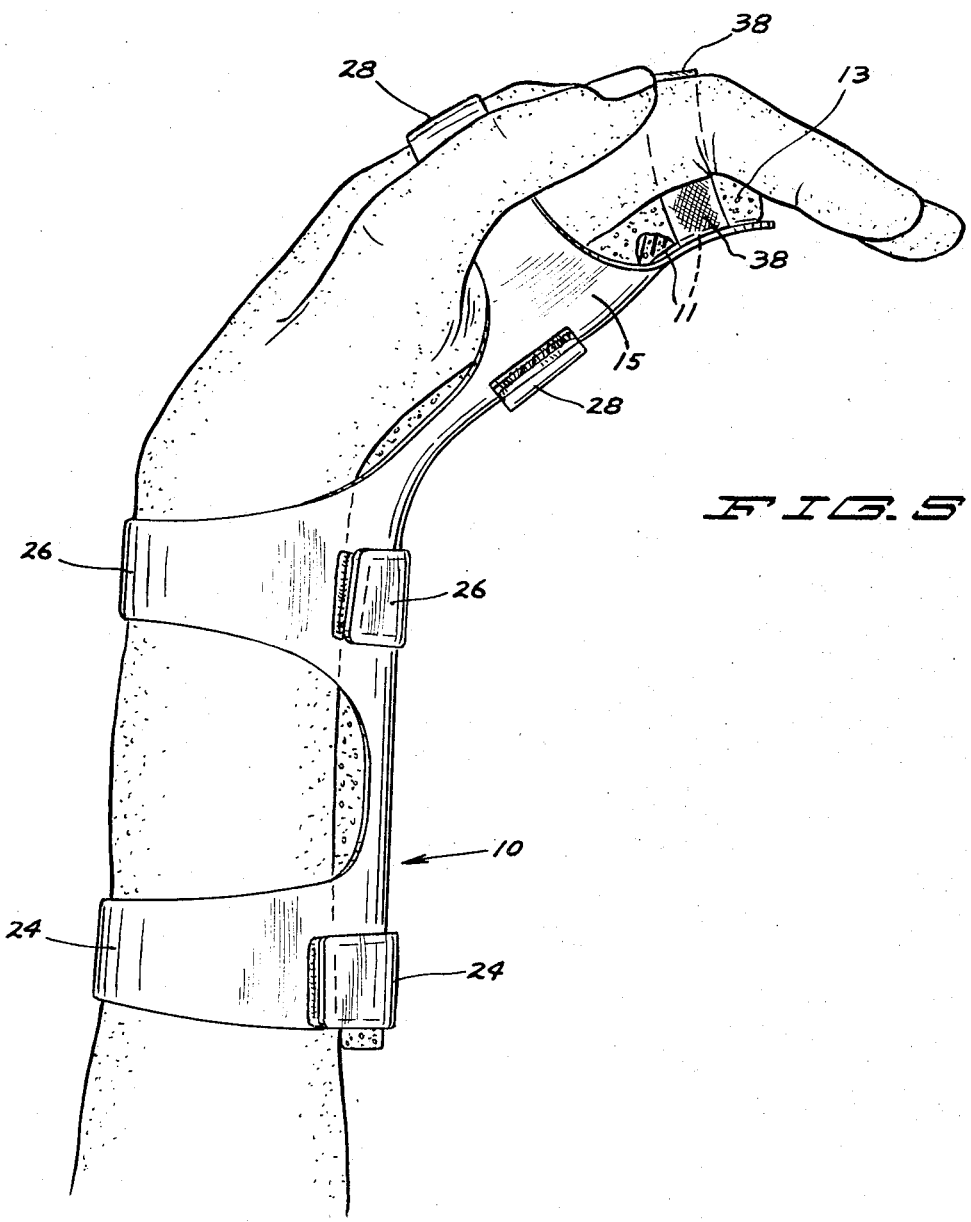
FIG. 5 is a perspective view of the splint of the invention installed on a user to support the forearm, wrist and hand of the user out of normal aligned relationship with each other.

In some instances, the physician will find it desirable to immobilize the forearm, wrist and hand with the parts in other than straight alignment. In this case, the physician, or someone under his direction, will cause the spine-like plate 11 of one of the regular forms of the invention to be deformed until the splint takes on a shape suitable for supporting the outer limb extremity as desired. Such a splint deformed into such a shape and supporting such an outer limb extremity is illustrated in FIG. 5. In that figure, the hand screws 34, the holes tapped in the plate 11, and the slab 22 have been omitted. It is to be understood, however, that a splint such as illustrated in FIGS. 1 through 4 could be deformed into a shape as shown in FIG. 5 or into any other desired shape, and the hand screws 34 in slab 22 could be utilized to provide specific evenly distributed pressures at specific points in the manner as illustrated and described in connection with FIG. 3.

The embodiments of the invention in which an exclusive property or privilege is claimed are defined as follows:

1. An orthopedic splint for an animal limb including an elongated rigid plate laminate lying in a substantially flat plane and having a front face and a rear face; a relatively soft pad laminate adhered to at least portions of said plate front face and covering said front face; fastening means including a plurality of straps fastened to the rear face of said plate and extending outwardly therefrom; said fastening means being of dimension and character to pass around said limb and to fasten adjacent the rear face of said plate thus to hold the pad in snug, contiguous relation to said limb and to hold said plate firmly against the pad and limb thus to substantially limit the movement of said limb; said fastening means including a leather-like flexible skin laminate adhered to said plate rear face and three straps extending outwardly from said laminate and designed to pass around the forearm, wrist and palm of a lower arm extremity of a Homo sapien; a plurality of hand screws threadably mounted through the plate in alignment with the longitudinal axis of said plate; a stiff, flexible, resilient, elongated slab between said pad and said plate and in alignment with said hand screws; the slab being fixed against longitudinal or transverse movement with respect to the pad, and having a dimension in each direction less than that of the plate, said screws being turned down to force the stiff, flexible, resilient slab away from the plate to provide evenly distributed pressure along this splint.

2. The orthopedic splint of claim 1 wherein said pad laminate extends out beyond the edges of the plate laminate in all directions; wherein said skin laminate completely overlies both the plate laminate and the pad laminate; and wherein all three laminae are bonded to each other.

* * * * *